United States Patent
Alber

(10) Patent No.: US 10,850,404 B2
(45) Date of Patent: Dec. 1, 2020

(54) SUCTION FRAME

(71) Applicant: WISCO LASERTECHNIK GMBH, Ravensburg (DE)

(72) Inventor: Gerhard Alber, Berg (DE)

(73) Assignee: WISCO LASERTECHNIK GMBH, Ravensburg (DE)

( * ) Notice: Subject to any disclaimer, the term of this patent is extended or adjusted under 35 U.S.C. 154(b) by 336 days.

(21) Appl. No.: 15/949,251

(22) Filed: Apr. 10, 2018

(65) Prior Publication Data

US 2018/0222061 A1 Aug. 9, 2018

Related U.S. Application Data

(63) Continuation of application No. PCT/EP2016/073072, filed on Sep. 28, 2016.

(30) Foreign Application Priority Data

Oct. 12, 2015 (DE) .......................... 10 2015 117 315

(51) Int. Cl.
| | |
|---|---|
| *B25B 11/00* | (2006.01) |
| *B25J 15/06* | (2006.01) |
| *B25J 15/00* | (2006.01) |
| *B25J 15/04* | (2006.01) |

(52) U.S. Cl.
CPC ......... *B25J 15/0616* (2013.01); *B25B 11/005* (2013.01); *B25J 15/0052* (2013.01); *B25J 15/04* (2013.01); *B25J 15/0491* (2013.01)

(58) Field of Classification Search
CPC .............................. B25B 11/00; B25B 11/005
See application file for complete search history.

(56) References Cited

U.S. PATENT DOCUMENTS

| | | | |
|---|---|---|---|
| 8,590,954 B2 | 11/2013 | Hümmeler et al. | |
| 2009/0292298 A1 | 11/2009 | Lin et al. | |
| 2011/0076128 A1* | 3/2011 | Johnsen ................ | B65G 21/14 |
| | | | 414/791.6 |
| 2018/0222061 A1* | 8/2018 | Alber .................... | B25B 11/005 |
| 2019/0302744 A1* | 10/2019 | Monti ................... | B23P 21/004 |

FOREIGN PATENT DOCUMENTS

| | | |
|---|---|---|
| EP | 2 111 936 A2 | 10/2009 |
| EP | 2 557 043 A1 | 2/2013 |
| EP | 2 708 335 A1 | 3/2014 |
| JP | 2013-252568 A1 | 12/2013 |
| JP | 2015-076605 A1 | 4/2015 |

OTHER PUBLICATIONS

International Search Report and Written Opinion (Application No. PcT/EP2016/073072) dated Mar. 28, 2017.

* cited by examiner

*Primary Examiner* — Lee D Wilson
(74) *Attorney, Agent, or Firm* — Burr & Brown, PLLC

(57) ABSTRACT

The present invention relates to a suction frame for conveying flat workpieces (e.g. circuit boards), a manipulator for equipping the suction frame, and a system for handling flat workpieces, e.g. circuit boards. A method for adjusting a suction frame is also claimed. Overall, the present invention allows suction frames to be equipped in a fully automatic, freely programmable manner for the production of different components within a production line.

3 Claims, 7 Drawing Sheets

SUCTION FRAME

CROSS REFERENCE TO RELATED APPLICATIONS

This application is a continuation of International Application No. PCT/EP2016/073072 filed Sep. 28, 2016, which designated the United States, and claims the benefit under 35 USC § 119(a)-(d) of German Application No. 10 2015 117 315.8 filed Oct. 12, 2015, the entireties of which are incorporated herein by reference.

FIELD OF THE INVENTION

The present invention relates to a suction frame, a transfer station for suction units, and a method for handling circuit boards.

BACKGROUND OF THE INVENTION

Suction frames in which suction elements, in particular suction sticks, are received on an adapter plate, which in turn can be fastened to an industrial robot, are known from the prior art. The suction elements herein are manually assembled at a predefined position on a raster and are, in each case by way of a hose, connected to a pump or to a suction device of another type. It is disadvantageous herein that at all times complex line systems that are prone to defects are to be routed in the region of the suction elements, in particular of the suction bellows, on account of which a change at short notice in the configuration or the position, respectively, of the suction elements is impeded.

Furthermore, systems are known in which complete suction frames which are prepared in a non-modifiable manner for a configuration pertaining to parts, for example, circuit boards, to be received are held available in an accumulator, a so-called "suction element station" and, depending on the part to be handled, are installed on a robot or are received by the latter, respectively. The lack of flexibility and the large space requirement, in the case of a multiplicity of configurations having to be catered to, are disadvantageous in these embodiments.

SUMMARY OF THE INVENTION

It is thus an object of the present invention to provide a suction frame which is adaptable in a simple, in particular, a fully automatic, manner to a component, for example, to a circuit board to be handled.

The present invention thus relates to a suction frame for transporting planar workpieces (for example, circuit boards), comprising an adapter and a multiplicity of suction units, wherein the adapter comprises a fluid connector and a line network; and wherein the adapter comprises a multiplicity of coupling receptacles that by way of the line network are connected to the fluid connector; and wherein each suction unit comprises a coupling head;

wherein the coupling receptacles and the coupling heads are mutually adapted in such a manner that each suction unit is coupleable in a latching manner to the adapter and is decoupleable in an unlatching manner from the adapter; and wherein at least one suction element of each suction unit in the coupled state is connected through the coupling head to the line network of the adapter.

By connecting a suction unit to a line network by way of a coupling head, the complex and costly routing of lines is dispensed with, and equipping suction frames in a fully automatic, freely programmable manner with suction elements for producing different components within one production line is enabled.

In one preferred refinement it is provided that each suction unit by way of the coupling head thereof, either by a plugging movement or by a plugging/rotating movement is coupleable to one of the coupling receptacles of the adapter, or that each suction unit by way of the coupling head thereof, either by a pulling movement or by a rotating/pulling movement is decoupleable from one of the coupling receptacles of the adapter (the plugging movement and the pulling movement being linear).

Movements of this type can be carried out by automatic manipulators and moreover permit suction frames to be equipped with suction elements in an improved fully automatic, freely programmable manner.

It is also preferred that the adapter has a multi-tiered construction, preferably a sandwich construction, wherein the multi-tiered construction comprises, in particular, at least one lower guide tier for guiding the coupling heads, for example, a lower guide plate and/or at least one upper coupling tier for coupling the coupling heads to the line network, for example, a coupling plate, and/or at least one profiled support to which at least one, preferably all tiers are fastened directly or indirectly is present between the tiers.

The lower tier herein guides the coupling head and absorbs transverse forces which arise in the movement of the suction frame on the robot. Conjointly with the upper tier which inter alia also supports the feedthrough to a vacuum coupling for connecting to a line network, a suction unit is thus preferably supported on two receptacles in order to withstand the forces in the movement of a planar workpiece on the suction frame having a robot.

It is moreover provided in one design embodiment of the present invention that the adapter has a raster on which the coupling receptacles are disposed periodically in at least one, preferably two, spatial directions.

By way of the raster-type arrangement of vacuum couplings, in particular of self-closing vacuum couplings, a line network can be provided on the adapter in a fixed manner. Depending on the configuration of a desired component to be transported, a suction unit can then be attached to each raster point, the vacuum coupling opening only in the case of the suction unit being present, and the suction unit optionally being able to be actuated individually or collectively by way of valves.

It is furthermore preferred that at least one suction unit is configured as a suction stick, wherein a suction bellows or a suction plate, for contacting a planar workpiece is spaced apart from the coupling head by way of a preferably telescopic stick.

Suction sticks offer the potential of plunging into stacks of circuit boards or into more complex geometries, without space having to be provided for the complete suction frame. This is required, for example, in the removal of circuit boards from stacks, the circuit boards in the peripheral region being held, positioned, and stored by bars.

One design embodiment provides that at least one suction unit comprises a fluid line that at least in portions across the extent thereof is inboard, preferably an inboard vacuum duct, for suctioning planar workpieces, wherein the fluid lines is configured so as to be inboard across in particular more than 50%, preferably more than 80%, particularly 100%, of a length extent of the suction unit.

The inboard routing of the fluid line, in particular of the vacuum duct, offers enhanced reliability in terms of defects, and permits simple and indiscriminate handling of the suction unit by means of a pick-and-place robot or of a transfer station.

A transfer station according to the present invention is provided for disposing the suction units on the adapter in a desired configuration in an automatic manner. In order for the equipping of suction frames with suction elements for the production of different components within one production line to be enabled in a fully automatic, freely programmable manner, a device must be able to dispose and remove the respective suction units.

The transfer station according to the present invention for transferring stored suction units to an adapter, or for retrieving suction units from an adapter, for providing a suction frame according to the present invention is characterized in that the transfer station comprises means, preferably gripping and/or pressing and/or rotating means, for activating a coupling mechanism of a coupling head on a suction unit, wherein the means are configured for activating, in particular opening and locking a latching connection on a coupling head of a suction unit.

The transfer station can preferably comprise at least one linear motion axis, preferably two linear motion axes in one plane, in order for a suction unit to be positioned at a desired location on an adapter, and/or that the transfer station comprises at least one motion axis, in particular a lifting unit, for moving a picked-up suction unit along the longitudinal axis of the latter.

The transfer station either drives the adapter in the x-y plane so as to approach the respective location in order for the suction unit to be positioned, or the robot which supports the adapter provides the latter at the appropriate location.

The transfer station in this instance can preferably comprise a lifting unit which plugs the suction units into the coupling receptacle, locks itself therein or is locked therein by the transfer station, the lifting unit coupling to a line network, preferably to a vacuum.

The transfer station can furthermore comprise an accumulator for suction units to be picked up, wherein the accumulator is preferably configured as a linear accumulator or as a revolving accumulator.

The storage of suction units is required since different configurations of the suction frame can render different numbers of suction units necessary.

According to the present invention, a system for handling planar workpieces, for example, circuit boards, which have dissimilar contours, is moreover provided. The system herein comprises a manipulator, an adapter, a multiplicity of suction units, a transfer station, and a magazine, wherein the manipulator is connected to the adapter;

wherein the adapter comprises a fluid connector and a line network;

wherein the adapter comprises a multiplicity of coupling receptacles that by way of the line network are connected to the fluid connector;

wherein the coupling receptacles and the coupling heads are mutually adapted in such a manner that each suction unit is in each case coupleable in a latching manner to the adapter, and is decoupleable in an unlatching manner from the adapter; and wherein at least one suction element of each suction unit in the coupled state is connected through the coupling head to the line network of the adapter.

A system of this type permits suction frames for the production of different components within a production line to be equipped with suction elements in a fully automatic, freely programmable manner.

It is preferred that the transfer station for dispensing one of the suction units to the adapter that is connected to the manipulator provides a suction unit in such a manner that either the manipulator by way of a linear repositioning movement drives the adapter by way of a free coupling receptacle in the coupling direction toward the coupling head until the latter latches into the free coupling receptacle;

or the transfer station by way of a linear repositioning movement drives the suction unit in the direction of a free coupling receptacle of the adapter that is positioned toward the transfer station in such a manner that the coupling head of said transfer station latches into the coupling receptacle.

Equipping a suction frame within a partially or fully automated production line in a flexible automated manner is enabled in this way.

It is moreover preferred that the transfer station for removing one of the suction units from the adapter that is connected to the manipulator stands by in such a manner that the manipulator and the transfer station by a movement of the manipulator and/or a movement of the transfer station for removing a suction unit that is held in the adapter are mutually positioned in such a manner that an activation means of the transfer station unlocks a latching mechanism of the suction unit, and the coupling head of the suction unit and the coupling receptacle of the adapter are subsequently separated from one another by a relative movement between the transfer station and the adapter.

A method for adapting a suction frame which comprises an adapter and at least one suction unit to planar workpieces of dissimilar contours is also according to the present invention, the method comprising the following steps:

removing all suction units that for a first workpiece are disposed on the adapter from the adapter;

equipping the adapter with the suction units required on the adapter for a second workpiece, the suction units corresponding to a pattern that is adapted to the workpiece.

The removal of all suction units prior to the re-equipment allows the automatic system a free choice of the equipping sequence, without any attention having to be paid to potentially existing equipment. This is a substantial criterion, in particular, for the positioning and the approach paths of the transfer station, the criterion improving the handling speed when equipping and removing.

Moreover, a method for adapting a suction frame which comprises an adapter and at least one suction unit to planar workpieces of dissimilar contours is according to the present invention, said method comprising the following steps:

removing all suction units that are not required for gripping the next workpiece from the adapter;

equipping the adapter with the suction units for the next workpiece required additionally to the suction units present.

The present invention permits the provision of fully automatic suction frames and the retooling of the latter without any manual intervention or complicated line routing.

BRIEF DESCRIPTION OF THE DRAWINGS

Further aspects of the present invention are described in an exemplary manner in the exemplary embodiments hereunder. However, the present invention is not limited to the embodiment illustrated.

DETAILED DESCRIPTION OF THE INVENTION

Figure 1:
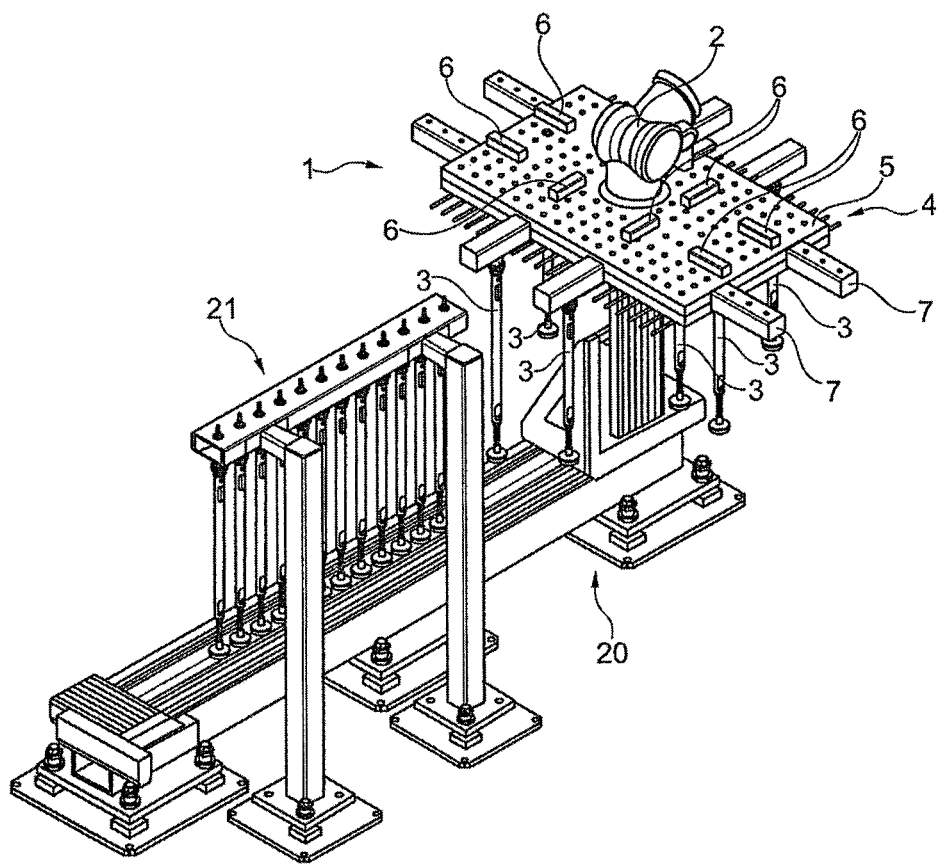
FIG. 1 shows a schematic view of a suction frame on a robot having a transfer station and a linear accumulator.

In detail, FIG. 1 shows a suction frame 1 on a robotic arm 2 (illustrated in part). Suction sticks 3 are illustrated on the suction frame 1, the suction sticks 3 having been disposed by way of a transfer station 20 from a linear accumulator 21. The transfer station illustrated will be explained in more detail in FIG. 8.

The suction frame 1 comprises an adapter 4 which is visible in the form of an upper plate 5. Vacuum couplings 6 which are contacted from the lower side by the coupling heads of the suction sticks 3 are located on the upper plate 5. For reasons of clarity, there is no line network illustrated on the upper side.

A plug-in raster which can optionally be provided with respective vacuum couplings in order for equipping that is as flexible as possible to be allowed is illustrated on the upper side of the plate 5.

The suction frame 1 furthermore comprises outriggers 7 which enable additional flexibility when equipping.

Figure 2:
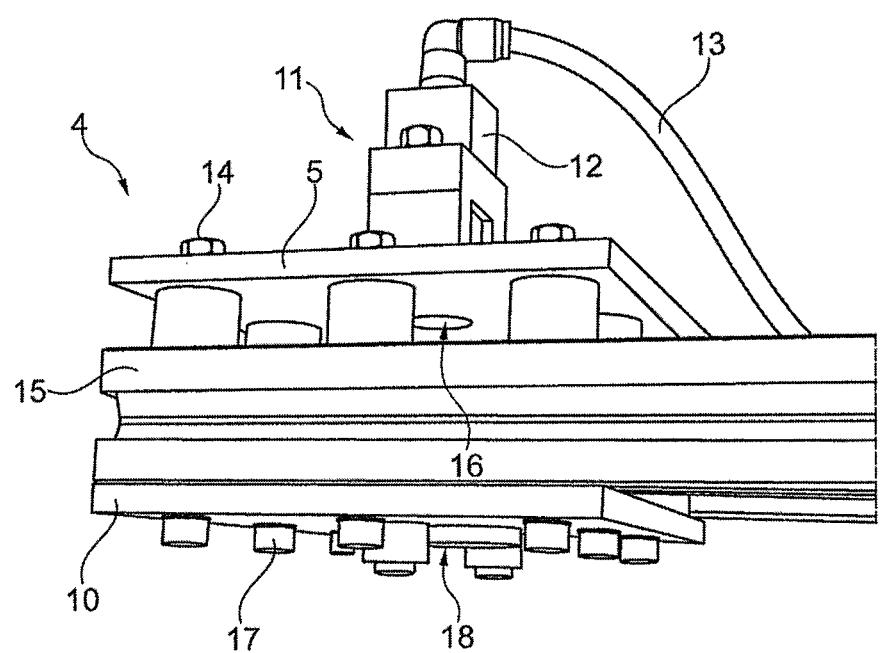
FIG. 2 shows a fragment of an adapter without a suction unit being disposed thereon.

FIG. 2 in fragments shows a sandwich construction of the adapter 4 according to the present invention. The sandwich construction comprises an upper plate 5 and a lower plate 10. The upper plate 5 supports the vacuum coupling 11 to which a line 13 for a line network is connected by way of a fluid connector 12. The upper plate 5 by way of screw connections 14 is screw-fitted to a support profile 15 and has an opening 16 for the passage of a coupling head, in order for the vacuum coupling 11 to be connected. The lower plate 10, likewise by way of a screw connections 17, is connected to the support profile 15 and comprises a coupling receptacle 18 for the feedthroughs the coupling head. A suction stick on account of the two receptacles in the opening 16 and in the coupling receptacle 18 is held in such a manner that the suction stick can withstand the motion forces when the suction frame 1 is being used.

Figure 3:
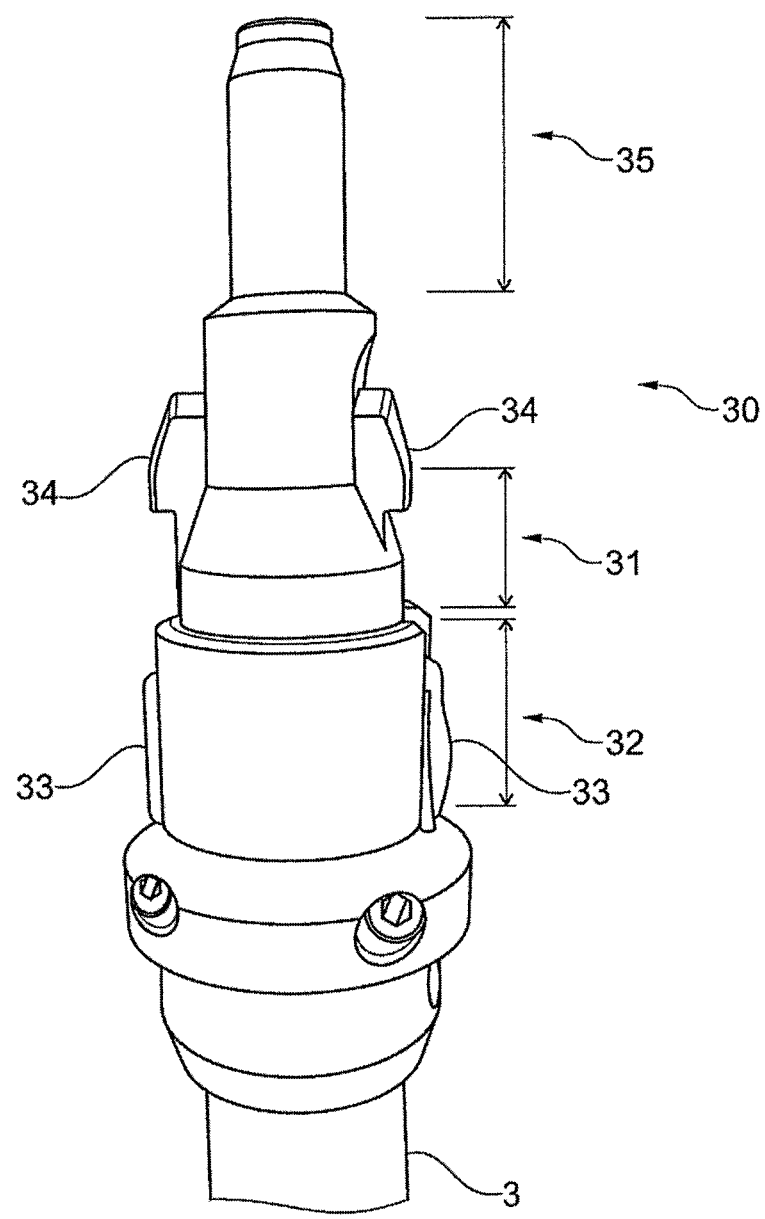
FIG. 3 shows a coupling head on a suction stick.

FIG. 3 shows an upper portion of a suction stick 3 having a coupling head 30. The coupling head 30 has dissimilar diameters on different portions. The receptacle in the coupling receptacle 18 is provided in a lower portion 31. The diameter is adapted so as to correspond to the lead through in the lower plate 10.

A handling region 32 for the transfer station is located therebelow. Means 33 for activating the locking mechanism 34 which presently is configured in the form of a latching catch are provided in the handling region. The means 32 are depressed by the transfer station, on account of which the catches 34 are retracted, allowing the suction stick 3 to be removed from the adapter 4 or to be inserted in the latter.

The feedthrough through the opening 16, which thereafter contact the vacuum coupling 11, is provided in the upper portion 35.

Figure 4:
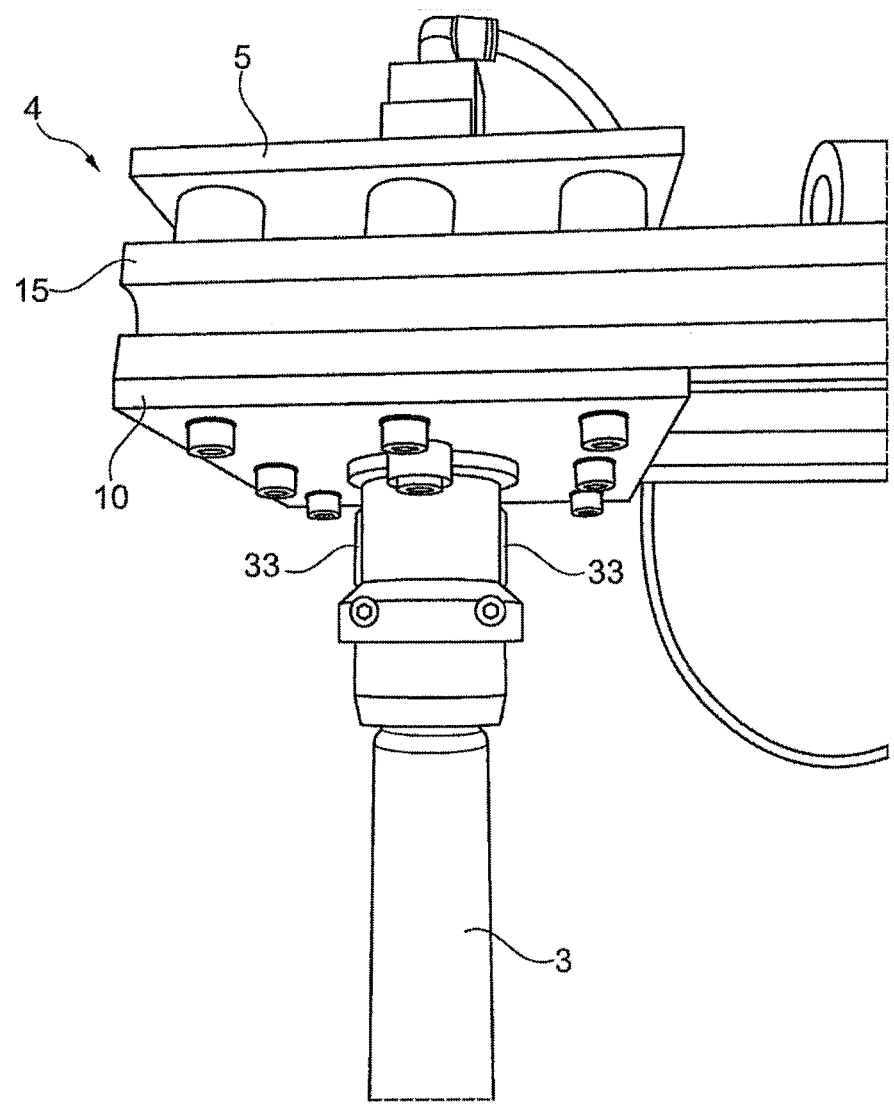
FIG. 4 shows in fragments an assembled suction stick on the adapter, having a plugged-in coupling head.

FIG. 4 shows an assembled state of a suction stick 3 in a fragment of an adapter 4.

Figure 5:
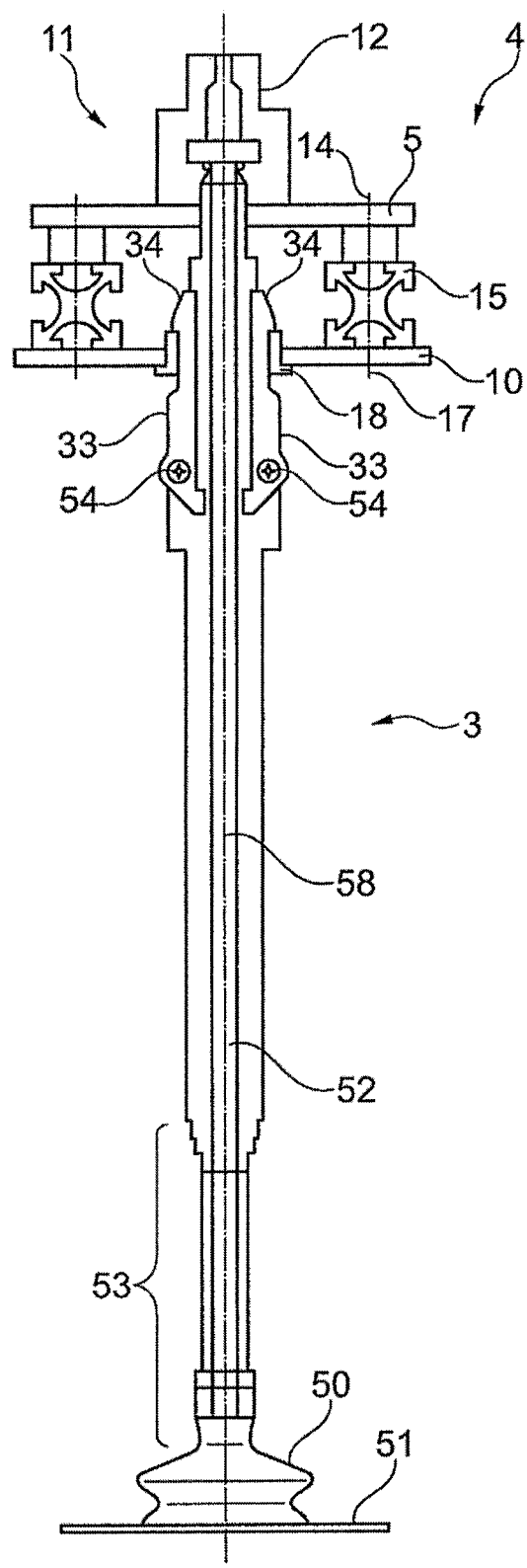
FIG. 5 shows a section through a suction stick on a fragment of an adapter.

The suction stick is shown in FIG. 5 in section in the assembled state, in a fragment of the adapter.

The suction stick 3 comprises a suction bellows 50 for receiving a planar workpiece 51 by suction. The suction bellows 50 is connected to the vacuum coupling 11 on the adapter 4 by way of an inboard vacuum line 52. A lower portion 53 of the suction stick 3 can be configured so as to be telescopic.

The suction stick 3, for fastening in the adapter 4, comprises a catch assembly 33 which can be pivoted by way of axles 54. The catches 33 latch into the coupling receptacle 18 and in the lower region 55 are simultaneously supported on the lower plate 10. The upper portion 35 is supported in the upper plate 5 and thus offers the assembled suction stick 3 a sufficient foothold in relation to transverse forces.

Figure 6:
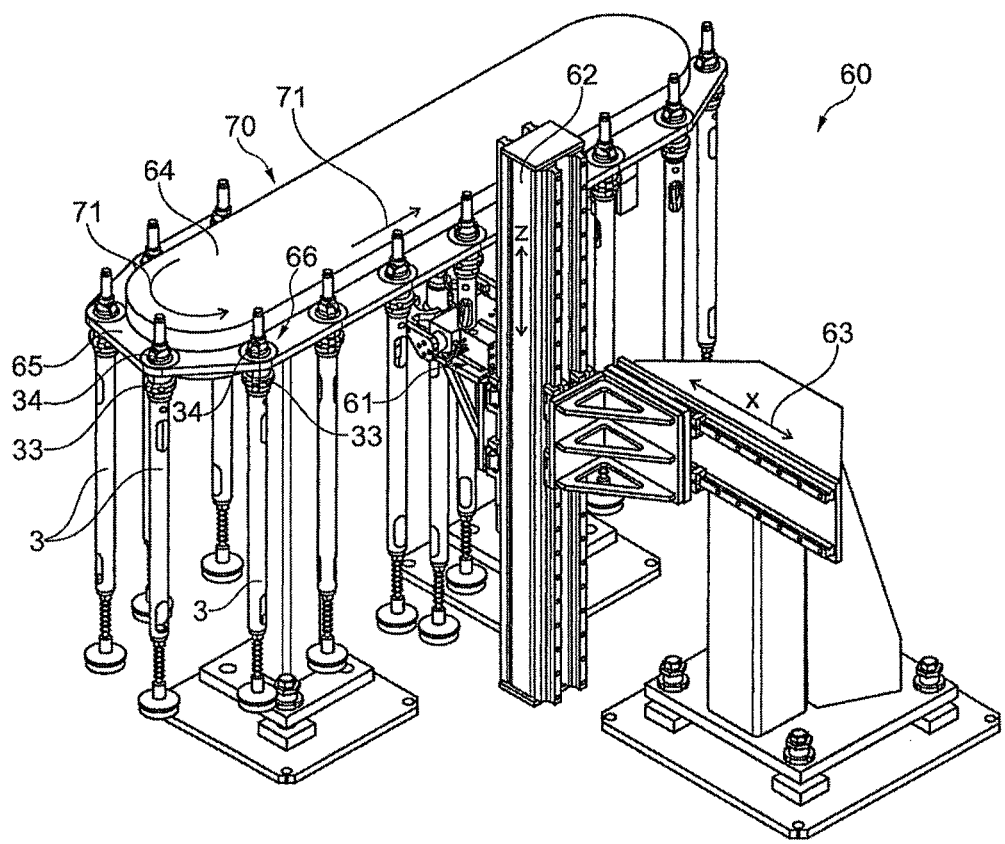
FIG. 6 shows a transfer station having a revolving accumulator.

FIG. 6 shows a transfer station 60. The transfer station comprises a suction gripper 61 which is disposed on a linear axis in the Z-direction 62 and on a linear axis in the X-direction 63. A chain 65 having receptacles 66 for suction sticks 3 is provided so as to revolve on a chain drive 64 in a revolving accumulator 70. The receptacles 66 likewise utilize the catches 33 having the latching catches 34 in order for the suction sticks 3 to be picked up and to be held.

The suction gripper encompasses the region 32 and herein depresses the means 33 in order for the latching catches to be moved in a radially inward manner and for the latter to be released. The suction stick can thereupon be removed from the accumulator 70 in the Z-direction by way of the Z-axis 62, along the longitudinal axis 58 of the suction stick, be fed to the adapter (not illustrated here) by way of the X-axis 63, and be inserted into said adapter. The revolving accumulator 70, by way of the conveyance of the chain 65, moves the next suction stick 3 onward in the conveying direction 71 and for removing or receiving provides the suction stick 3, or a free space, respectively.

Figure 7:
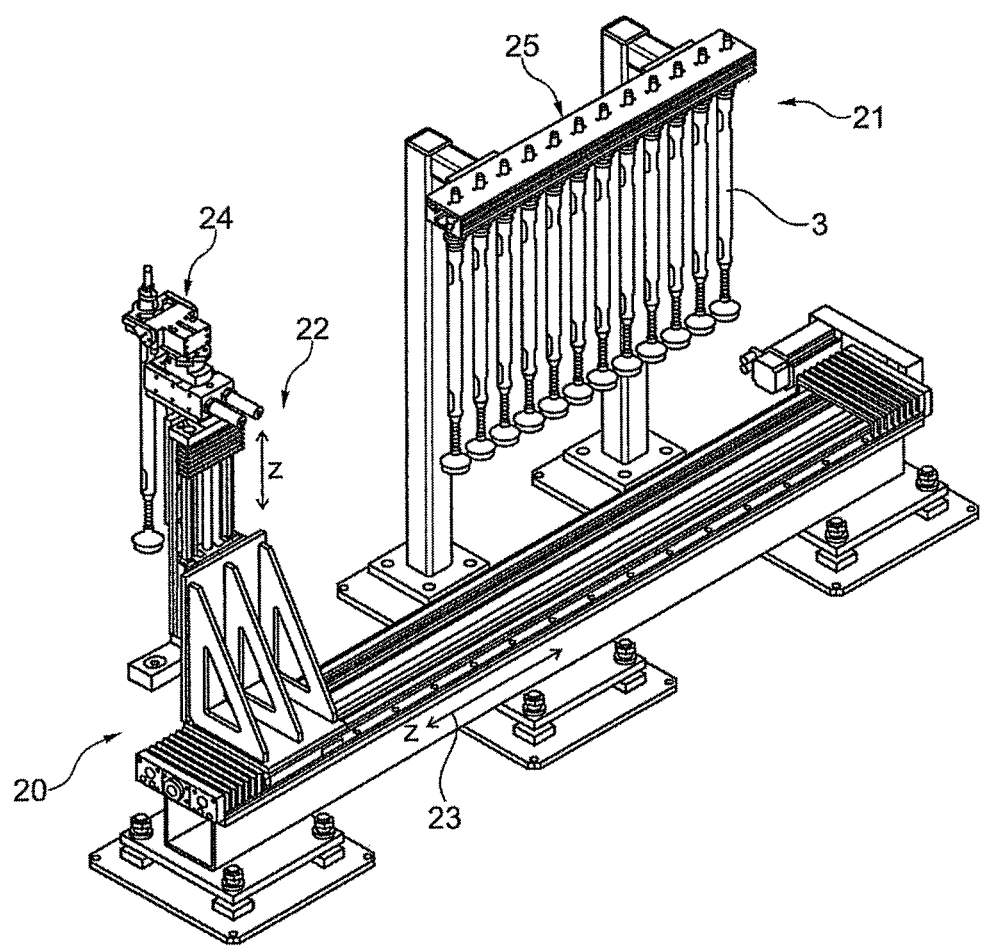
FIG. 7 shows a transfer station having a linear accumulator.

A respective assembly having a linear accumulator is illustrated in FIG. 7.

The transfer station 20 comprises a suction gripper 24 which is disposed on a linear axis in the Z-direction 22 and on a linear axis in the X-direction 23. Receptacles 25 for suction sticks 3 are provided longitudinally in a linear accumulator 21. The receptacles 25 likewise utilize the catches 32 having the latching catches 34 in order for the suction sticks 3 to be picked up and to be held.

The suction gripper 24 encompasses the region 32 and herein depresses the means 33 in order for the latching catches to be moved in a radially inward manner and for the latter to be released. The suction stick can thereupon be removed from the accumulator 21 in the Z-direction by way of the Z-axis 22, along the longitudinal axis 58 of the suction stick, be fed to the adapter (not illustrated here) by way of the X-axis 23, and be inserted into the adapter. The linear accumulator 21, for removing or receiving, respectively, is correspondingly approached by way of the X-axis 23 at a stored suction stick 3 or at a free space.

The invention claimed is:

1. A system for handling planar workpieces that have dissimilar contours, said system comprising a manipulator, an adapter, a multiplicity of suction units, a transfer station, and a magazine,
    wherein the manipulator is connected to the adapter;
    wherein the adapter comprises a fluid connector and a line network;
    wherein the adapter comprises a multiplicity of coupling receptacles that by way of the line network are connected to the fluid connector;

wherein the coupling receptacles and the coupling heads are mutually adapted in such a manner that each suction unit is in each case coupleable in a latching manner to the adapter, and is decoupleable in an unlatching manner from the adapter; and wherein at least one suction element of each suction unit in the coupled state is connected through the coupling head to the line network of the adapter.

2. The system as claimed in claim 1, wherein the transfer station for dispensing one of the suction units to the adapter that is connected to the manipulator provides a suction unit in such a manner that either the manipulator by way of a linear repositioning movement drives the adapter by way of a free coupling receptacle in the coupling direction toward the coupling head until the latter latches into the free coupling receptacle; or the transfer station by way of a linear repositioning movement drives the suction unit in the direction of a free coupling receptacle of the adapter that is positioned toward the transfer station in such a manner that the coupling head of said transfer station latches into the coupling receptacle.

3. The system as claimed in claim 1, wherein the transfer station for removing one of the suction units from the adapter that is connected to the manipulator stands by in such a manner that the manipulator and the transfer station by at least one of a movement of the manipulator and a movement of the transfer station for removing a suction unit that is held in the adapter are mutually positioned in such a manner that an activation means of the transfer station unlocks a latching mechanism of the suction unit, and the coupling head of the suction unit and the coupling receptacle of the adapter are subsequently separated from one another by a relative movement between the transfer station and the adapter.

* * * * *